INVENTOR.
DUANE A. MACHTIG
BY Robert Charles Hill
ATTORNEY

United States Patent Office 3,429,640
Patented Feb. 25, 1969

3,429,640
PROCEDURE FOR SOUND/IMAGE MOVIE FILM SYNCHRONIZATION
Duane A. Machtig, Newark, Calif., assignor to The Bank of California, National Association, San Francisco, Calif.
Filed Dec. 30, 1966, Ser. No. 606,435
U.S. Cl. 352—5     2 Claims
Int. Cl. G03b 31/02

This invention relates to a method for synchronizing the sound and image on a picture film, and in particular for synchronizing the sound and image on small size picture films such as regular 8 mm. film and Super 8 mm. film.

The use and quality of home movies has greatly increased in the last few years. The cameras for these home movies use either regular 8 mm. film or the newly introduced Super 8 film. Some of these home movies are now being produced with sound. The use of sound movies is also of great interest to businessmen who realize the possibilities of using sound movies to advantage in managing a corporation. Although sound and image synchronization has been achieved in commercial and Hollywood type films employing much larger film—16 mm., 35 mm. and 70 mm. movie film—it is not practical to use these methods for low cost regular 8 mm. and Super 8 mm. sound film.

In the movie industry at the present time, there are two ways in which sound may be incorporated with the image part of the film. One is optical sound which utilizes a camera that records the sound with light patterns on the film itself, and as the film is developed both the sound track and the image track are developed simultaneously so that complete synchronization is achieved. Optical sound produces a synchronous sound and an acceptable sound but one of low quality. Moreover, optical sound is not suitable for regular 8 or Super 8 film in that the optical sound image pattern on the film takes up a substantial amount of space and thereby decreases the regular image space available for visual reproduction.

In the use of a magnetic sound system for use with regular 8 and Super 8 film, the heretofore usual way of synchronizing the image with the sound was by use of a pulse generator synchronizer system. This involved the use of a magnetic stripe which was placed on the film after it was developed. The sound was reproduced on the magnetic stripe. A pulsing generator was used to drive a synchronous motor according to the output of the respective outlets for the recorder and the projector so that if there was a drop in power, the camera was slowed down, or if there was a rise in power, it was increased so that when the sound was put on the film, the pulsing generator governed the devices to keep them in synchronization, or as the term is used in the art "sync". By sync is meant that the precise lip movements of the person on the film coincide exactly with the sound of the film within a one or two frame differential.

As described above, the optical sound system is not applicable to the regular 8 and Super 8 film. The sound synchronized camera which uses the pulse generator synchronizing system is quite expensive and takes a very professional photographer to operate as it does not presently come equipped with automatic settings of aperture and speed.

In addition, feeble attempts have been made to synchronize the sound on regular 8 and Super 8 film by use of a tape recorder located in the movie camera. This, however, makes the camera very bulky and heavy and quite expensive if a good tape recorder system is inserted into the camera. With an inexpensive tape recorder system, the sound is poor even though there is precise synchronization.

Applicant overcomes all of the above described problems by use of his novel method wherein the sound portion of the film is separately taped on a tape recorder and later put onto the magnetic stripe of the film by means of a variable transformer which operates the drives the sound projection system at the same voltage as was used in driving the tape recorder during the recording and filming session.

The primary object of this invention is to provide a new and improved method for synchronizing the sound and image on a picture film.

Another object of the invention is to provide a method for synchronizing the sound and image on a picture film which is relatively easy to perform and inexpensive in cost.

Other features, objects and advantages of the present invention will become apparent from the following description of a preferred embodiment illustrated in the accompanying drawing in which.

In accordance with the present invention, the film is shot and the sound is recorded on a tape recorder. The film is then developed and a magnetic stripe is laid on the film in a manner well-known in the art for later receiving the sound. The magnetic stripe is usually laid on the left side of the film after the film is developed. When the developed film is returned, the sound is then placed on the magnetic stripe and synchronized to match the lip movements so that the end result is a full sound black and white or color movie incorporated on the film.

Figure 1:
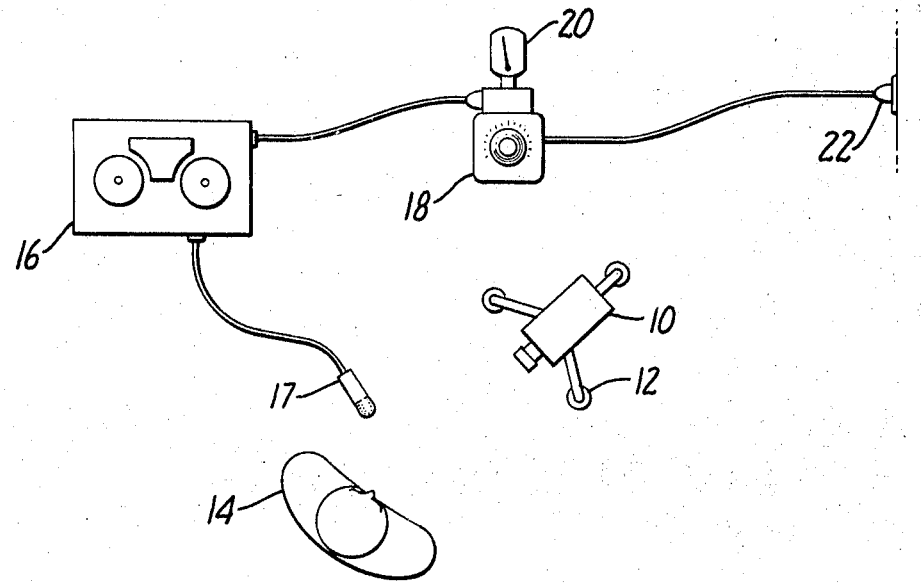
FIGURE 1 is a schematic view of the initial filming and taping step.

Referring particularly to FIGURE 1, a camera 10 supported by tripod 12 is situated within camera range of the subject to be filmed such as an actor 14. The sound is recorded in tape recorder 16 through microphone 17, the tape recorder 16 being driven by a variable voltage transformer 18 having connected thereto an accurate volt meter 20. Power for the operation is derived from wall outlet 22. Both the variable voltage transformer 18 and the volt meter 20 should have a range of approximately zero to 140 volts. The volt meter is required because for complete synchronization the voltage must be accurately known and sometimes this is not always possible with the equipment included in the regular voltage transformer.

The procedure is to supply power to all of the equipment and set the variable voltage transformer at a known voltage such as 115 volts or 120 volts as indicated by the volt meter 20. With all the equipment now supplied with power, it is necessary to obtain a sound reference point on the tape as well as the film so that when sound is later put on the magnetic stripe of the film it will be easy to locate the starting point. This sound reference may be easily obtained by using a slate board or some other type of equipment which gives a sound for the microphone to hear as well as a blur in the film. The sound reference point determines the exact frame of the film on which to start. The actual filming is then begun with the sound being recorded on the tape recorder 16 and the film being exposed in camera 10.

After the film has been exposed, it is processed in a manner well-known in the art and the magnetic sound stripe is then added to the roll of film. Any narration on the tape should be done at this time so that the result is a smooth flowing continuous narration of the film as it is put on the magnetic sound stripe.

Figure 2:
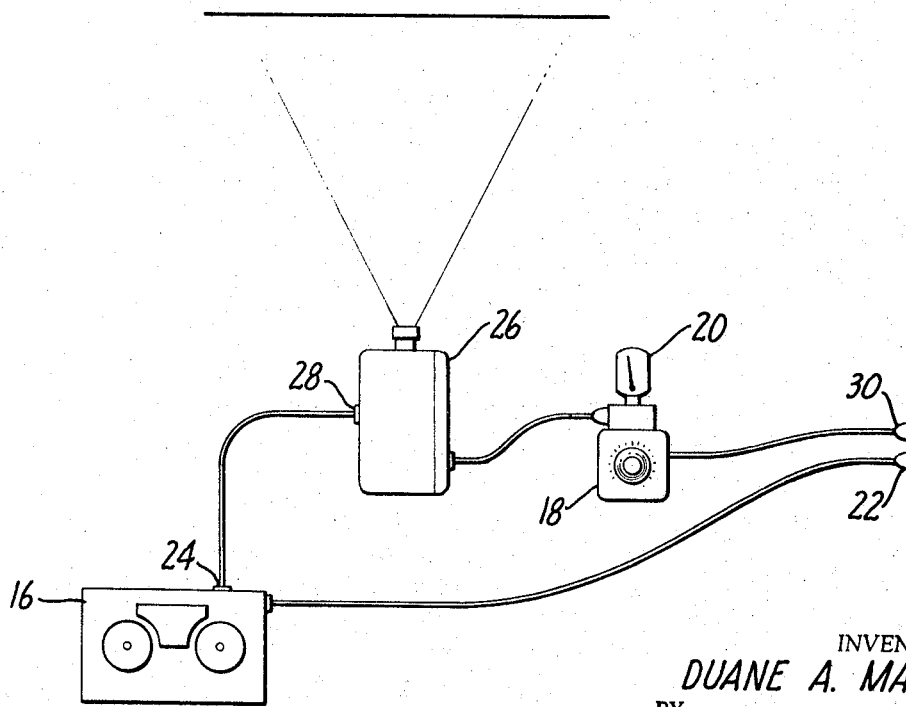
FIGURE 2 is a schematic view of the equipment required to combine the sound with the image on the film.

Referring now to FIGURE 2, which illustrates the sound image synchronization equipment, tape recorder 16 receives power from wall outlet 22 and is connected at its preamp output plug 24 to a sound movie projector 26 at its input section 28. Attached to the sound projector 26 is variable voltage transformer 18 which receives power from wall outlet 30 and has accurate volt meter 20 attached thereto.

The projector 26 having therein the developed film with magnetic sound stripe is run until the sound reference point is located. This can be seen by a blur in at least one of the frames. The volt meter 20 is then set to the same position as was used in the recording of the sound in the first step by suitable adjustment of transformer 18. The tape recorder 16 is then run forward to the same sound reference point which can be easily discernible. When both sound reference points are located on the tape recorder 16 and the sound projector 26, one simultaneously turns on both of these units and has the movie projector in the "record" position so that the sound from the tape recorder 16 goes directly onto the magnetic sound stripe on the film. With the projector 26 in the "project" position, it is very easy to monitor the actor or image on the film with the sound coming from the tape recorder. If the sound gets ahead of the picture, a mere increase in the setting of the variable voltage regulator 18 will put the sound and image back in sync. Likewise if the sound gets behind the picture, a decrease in the variable voltage regulator, a volt at a time, is necessary to achieve proper sync.

By use of the above described method, it is possible to obtain a sound movie film in accurate synchronization at a very low cost and with equipment which is readily purchasable on the open market and requiring very few changes after purchase.

The foregoing detailed description has been given for clearness of understanding only and no unnecessary limitation should be incorporated therefrom for many modifications will be obvious to those skilled in the art.

I claim:
1. The method of synchronizing a magnetic sound track on a motion picture film comprising the steps of:
    (a) taking a motion picture scene,
    (b) simultaneously recording sound from said scene on a tape recorder, said tape recorder being supplied with current from a variable voltage transformer having a voltmeter connected thereto,
    (c) developing and running said film,
    (d) simultaneously playing back said tape recorder and recording the sound on said film, and
    (e) adjusting said variable voltage transformer whereby the playback voltage is the same as the record voltage.
2. The method of claim 1 wherein a visual indication is made on the film simultaneously with an audible indication on said tape to establish a starting point.

References Cited
UNITED STATES PATENTS

| | | | |
|---|---|---|---|
| 1,210,323 | 12/1916 | Janssens | 352—12 |
| 2,649,016 | 8/1953 | Fairbanks | 352—24 |
| 2,976,765 | 3/1961 | Banno | 352—20 |
| 3,266,862 | 8/1966 | Wagoner | 352—12 |

NORTON ANSHER, *Primary Examiner.*

DAVID S. STALLARD, *Assistant Examiner.*

U.S. Cl. X.R.

352—12, 21